Feb. 14, 1961    L. A. ANDERSON    2,971,587
ROCK MOVER
Filed July 22, 1958    2 Sheets-Sheet 1
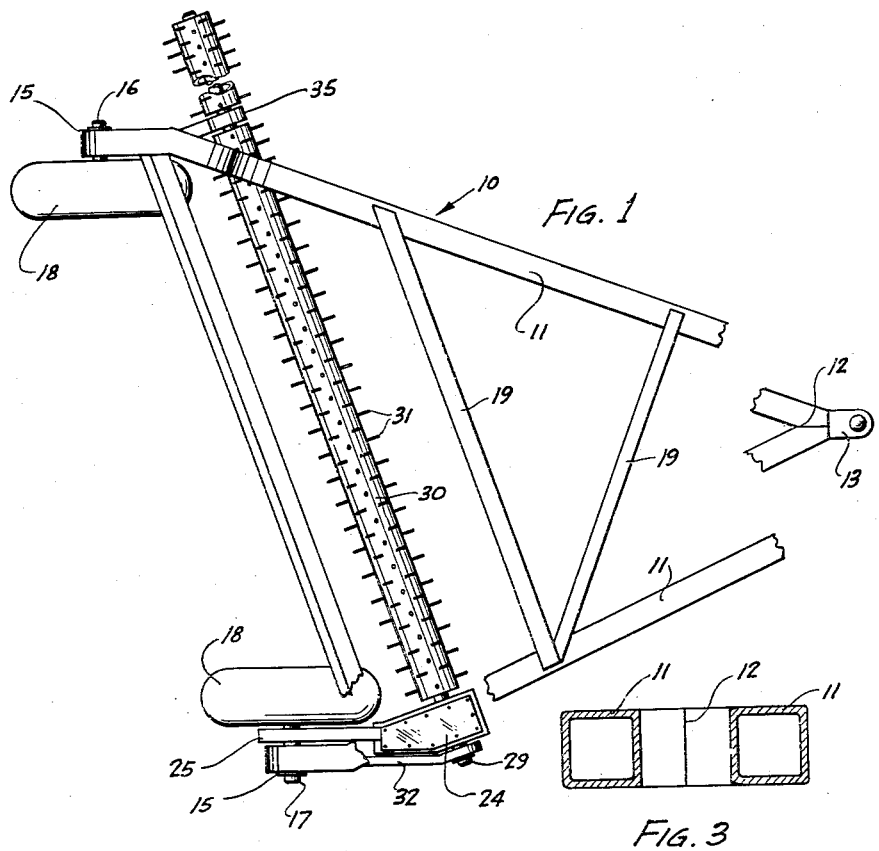
FIG. 1
FIG. 3
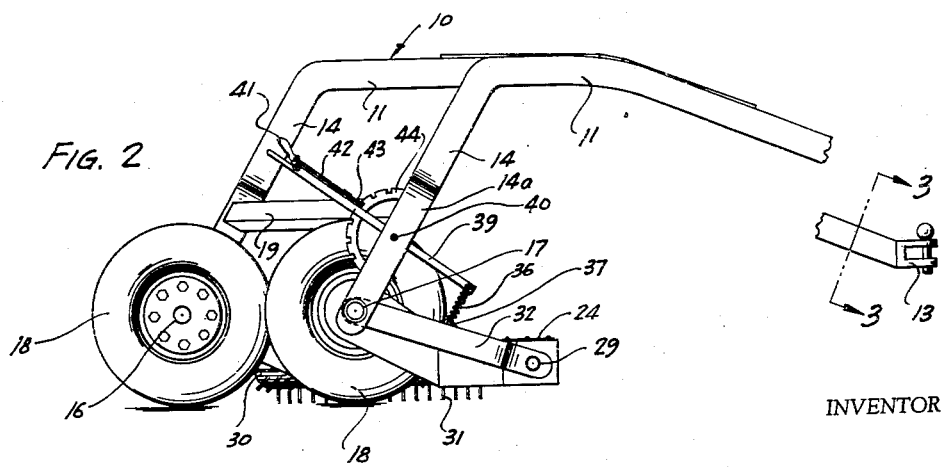
FIG. 2
INVENTOR
LESLIE A. ANDERSON
BY
ATTORNEY Feb. 14, 1961 L. A. ANDERSON 2,971,587
ROCK MOVER
Filed July 22, 1958 2 Sheets-Sheet 2
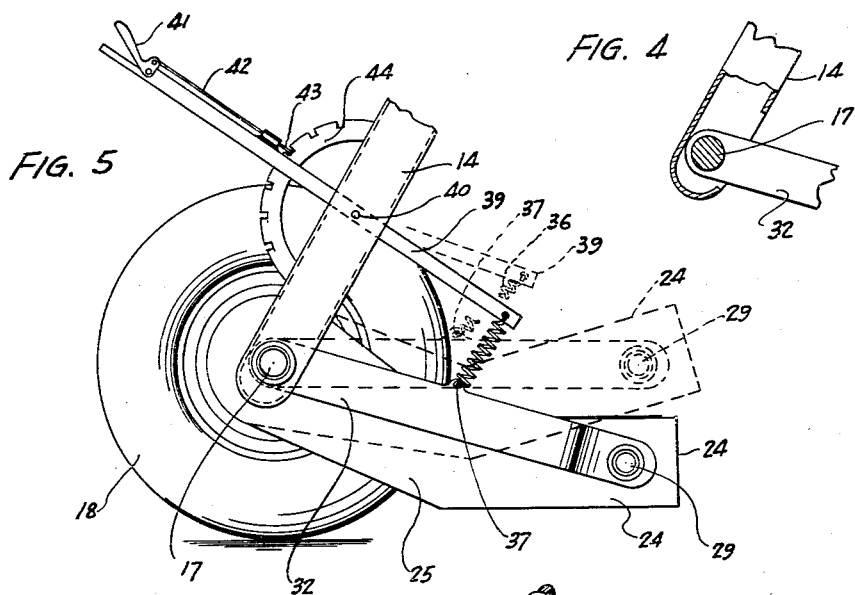
FIG. 4
FIG. 5
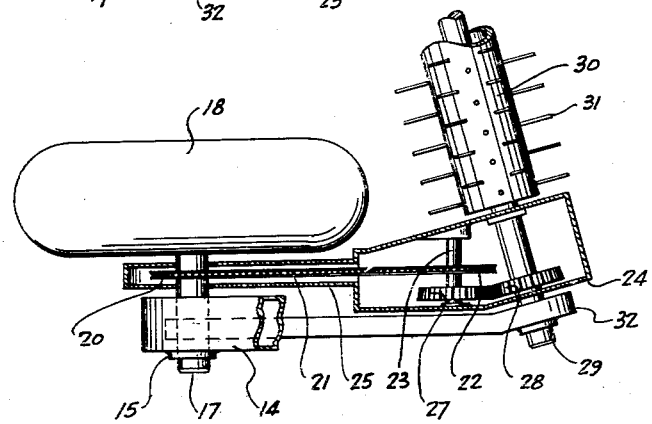
FIG. 6
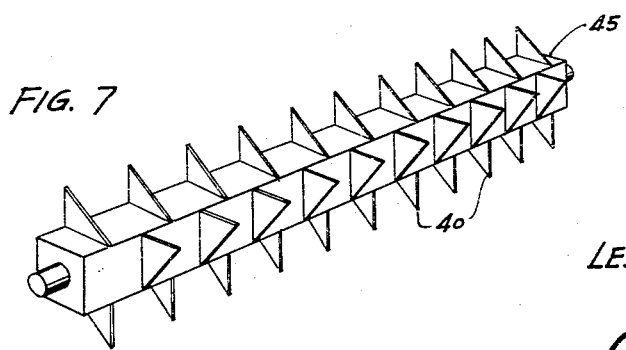
FIG. 7
LESLIE A. ANDERSON
INVENTOR
BY
ATTORNEYS.

2,971,587
ROCK MOVER

Leslie A. Anderson, Box 56, Frontier, Saskatchewan, Canada

Filed July 22, 1958, Ser. No. 750,168

1 Claim. (Cl. 171—63)

This invention relates to a rock mover, and has as its primary object the provision of a device adapted to be towed over a field or similar area for the purpose of moving and stacking rocks thereon.

An additional object of the invention is the provision of such a device which includes a toothed rotatable member inclined relative to the path of travel of the device for removing the rocks from the surface of the field by guiding the same to rows at the side of the path of travel of the device from which rows they may be picked up either manually or mechanically for removal.

Still another object of the invention is the provision of a device of this character which includes a frame and means for raising and lowering the rotatable member for the purpose of governing the size of the rocks which may be removed thereby.

A further object of the invention is the provision of means in association with the rotatable member for rotating the same, either from the rotation of the wheels upon which the frame rides, or from a separate source of power.

Still other objects reside in the combinations of elements, arrangements of parts, and features of construction, all as will be more fully pointed out hereinafter and shown in the accompanying drawings, wherein there is disclosed a preferred embodiment of this inventive concept.

In the drawings:

Figure 1 is a top plan view of one form of apparatus embodying features of the instant invention, parts thereof being broken away.

Figure 2 is a side elevational view of the construction of Figure 1, parts thereof being broken away.

Figure 3 is an enlarged sectional view taken substantially along the line 3—3 of Figure 2 as viewed in the direction indicated by the arrows.

Figure 4 is an enlarged sectional view of a constructional detail.

Figure 5 is an enlarged elevational view of a portion of the mechanism of Figure 2, a different position of adjustment being indicated in dotted lines.

Figure 6 is a fragmentary plan view of the drive mechanism for the rotatable member, parts thereof being removed.

Figure 7 is a perspective view of a modified form of rotatable element.

Similar reference characters refer to similar parts throughout the several views of the drawings.

Having reference now to the drawings in detail, there is generally indicated at 10 a frame, which includes side bars 11, preferably of rectangular hollow construction, which come together at a point 12, and are provided with a hitching element 13 for attachment of the device to a tractor or the like. As best shown in Figure 2, the frame members 11 are substantially U-shaped, and having a depending rear section 14, which terminates in bushings 15, in which are adapted to be mounted offset axles 16 and 17, which carry rotatable wheels 18. The frame member includes transverse supporting structures 19 for reinforcement purposes, and has at one side thereof an offset L-shaped member 32 which contains an additional bushing surrounding the axle 17. The axle 17 carries exterior of its associated wheel 18 at one end thereof a gear 20, which engages a chain 21, which in turn engages a second sprocket gear 22 mounted on an axle 23, which is contained within a gear housing 24. A second gear housing 25, comprising a continuation of the gear housing 24 surrounds the chain 21 and sprocket gear 20. A beveled gear 27 is also mounted on shaft 23 and engages a second beveled gear 28 mounted on a shaft 29, which is journalled in the projecting end of member 32, and which carries a rotatable member 30, provided with teeth 31. The other end of the axle 29 is supported by a brace 35, which is pivotally mounted on the axle 16, so that the entire assembly including the rotatable member 30 may be raised or lowered about an axis formed of axles 16 and 17. For effecting such raising and lowering movement, spring 36 is connected to an eye 37 carried by arm 32, the other end being connected to one end of a lever 39, which is pivotally mounted on the frame as by means of a pivot 40, and has a handle 41, which actuates a rod 42, which in turn releases or secures a detent 43, which engages in an arcuate toothed rack 44 for the purpose of securing the lever, and hence the rotating member 30 in a desired position of adjustment.

Figure 7 discloses a modified form of rotating member 45, which is rectangular in configuration and is provided with teeth 46.

The rectangular member 45 may be obviously substituted for the member 30, and employed in the same manner and for the same purpose.

From the foregoing the use and operation of the device should now be obvious. When towed by a towing vehicle such as a tractor, the rotation of the wheels 18 will in turn cause rotation of the rotatable member 30, which will engage, through its teeth 31, any loose rock lying in the field or other surface over which it is travelling. The rocks will then be guided in the direction of incline of the member 30 towards the side of the path of travel of the device, and stacked in rows adjacent the end of the device, from which they may be readily removed either manually or mechanically as desired.

The length of the rotatable member 30 may obviously be varied, and may if desired extend beyond the frame and wheel at the rear end of the inclination thereof, in order to cover a wider path. In the arrangement herein shown, the device is shown as being powered by the rotation of the wheels 18, but it will be equally obvious that if desired connection may be made to the power take-off of a tractor or similar vehicle, which in turn will rotate the member 30 or its alternate member 45, as may be desired.

From the foregoing it will now be seen that there is herein provided a device which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

What I claim is:

In a rock mover, the combination of a frame, wheel supported axles on said frame, a gear housing mounted for pivotal movement on one of said axles, an elongated bearing member mounted on said axle adjacent to said gear box, an elongated rotatable rock moving member having a shaft, one end of said shaft extending through said gear housing, mounted in said elongated bearing, a brace including a bearing pivotally mounted for vertical swinging movement on the frame in which the other end of said shaft is disposed, said rotary rock moving member being disposed at an acute angle with respect to said frame with its discharge end disposed a substantial distance beyond one side of said frame beyond the path of travel of the adjacent supporting wheel, teeth on said rotary rock moving member adapted to direct rocks laterally of said frame and away from said gear housing, depositing rocks at one end of said rotary rock moving member, gearing in said gear housing operating said rotatable rock moving member, and manually controlled means for effecting vertical movement of said rotatable rock moving member, elevating said rock moving member above the large or solid rocks within the path of travel of the rock mover.

References Cited in the file of this patent

UNITED STATES PATENTS

| | | |
|---|---|---|
| 1,406,063 | Nagy | Feb. 7, 1922 |
| 2,497,717 | Bowman | Feb. 14, 1950 |
| 2,755,612 | Johnson | July 24, 1956 |